United States Patent
Hanetz et al.

(10) Patent No.: US 12,223,406 B2
(45) Date of Patent: *Feb. 11, 2025

(54) SYSTEM AND METHOD FOR DETERMINING DEVICE ATTRIBUTES USING A CLASSIFIER HIERARCHY

(71) Applicant: Armis Security Ltd., Tel Aviv (IL)

(72) Inventors: Tom Hanetz, Tel Aviv (IL); Yuval Friedlander, Petah Tikva (IL)

(73) Assignee: Armis Security Ltd., Tel Aviv-Jaffa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,235

(22) Filed: Apr. 10, 2024

(65) Prior Publication Data

US 2024/0256979 A1    Aug. 1, 2024

Related U.S. Application Data

(63) Continuation of application No. 16/729,823, filed on Dec. 30, 2019, now Pat. No. 11,983,611.

(51) Int. Cl.
*G06N 20/00* (2019.01)
*G06F 16/35* (2019.01)
(Continued)

(52) U.S. Cl.
CPC ............. *G06N 20/00* (2019.01); *G06F 16/35* (2019.01); *G06F 18/2113* (2023.01);
(Continued)

(58) Field of Classification Search
CPC ........ G06N 20/00; G06N 3/084; G06N 20/20; G06N 3/045; G06N 3/044; G06N 3/088;
(Continued)

(56) References Cited

U.S. PATENT DOCUMENTS 1,145,501 A    7/1915  More et al.
11,455,501 B2 *  9/2022 Paula ...................... G06N 3/045
(Continued)

FOREIGN PATENT DOCUMENTS

WO    2019164484 A1    8/2019

OTHER PUBLICATIONS

European Application No. 20908490 Extended European Search Report Mailed Dec. 8, 2023, pp. 1-9.
(Continued)

*Primary Examiner* — Kyung H Shin
(74) *Attorney, Agent, or Firm* — Perkins Coie LLP

(57) ABSTRACT

A system and method for determining device attributes using a classifier hierarchy. The method includes: sequentially applying a plurality of sub-models of a hierarchy to a plurality of features extracted from device activity data, wherein the sequential application ends with applying a last sub-model of the plurality of sub-models, wherein each sub-model includes a plurality of classifiers, wherein each sub-model outputs a class when applied to at least a portion of the plurality of features, wherein each class is a classifier output representing a device attribute, wherein applying the plurality of sub-models further comprises iteratively determining a next sub-model to apply based on the class output by a most recently applied sub-model and the hierarchy; and determining a device attribute based on the class output by the last sub-model.

20 Claims, 5 Drawing Sheets

(51) Int. Cl.
| | |
|---|---|
| *G06F 18/2113* | (2023.01) |
| *G06F 18/213* | (2023.01) |
| *G06F 18/214* | (2023.01) |
| *G06F 18/24* | (2023.01) |
| *G06F 18/241* | (2023.01) |
| *G06F 18/2431* | (2023.01) |
| *G06Q 40/02* | (2023.01) |
| *H04L 9/40* | (2022.01) |
| *H04L 43/0817* | (2022.01) |
| *G06V 30/24* | (2022.01) |

(52) U.S. Cl.
CPC .......... *G06F 18/213* (2023.01); *G06F 18/214* (2023.01); *G06F 18/241* (2023.01); *G06F 18/2431* (2023.01); *G06F 18/24765* (2023.01); *G06Q 40/02* (2013.01); *H04L 43/0817* (2013.01); *H04L 63/14* (2013.01); *H04L 63/1408* (2013.01); *G06V 30/2528* (2022.01)

(58) Field of Classification Search
CPC .. G06N 3/08; G06N 5/01; G06F 16/35; G06F 16/3329; G06F 18/24765; G06F 18/24; G06Q 40/02; G06Q 30/0201; G06V 10/765; G06V 10/768; H04L 63/1425; H04L 61/4511; H04L 63/1408; H04L 61/5014; H04L 63/20; H04W 12/122; G16H 30/20
See application file for complete search history.

(56) References Cited

U.S. PATENT DOCUMENTS

| | | | |
|---|---|---|---|
| 2018/0124096 A1 | 5/2018 | Schwartz et al. | |
| 2018/0191593 A1 | 7/2018 | De Knijf et al. | |
| 2018/0225592 A1* | 8/2018 | Ponnuswamy | ........ G06N 20/00 |
| 2019/0156198 A1* | 5/2019 | Mars | ........ G06Q 40/02 |
| 2020/0076853 A1* | 3/2020 | Pandian | ........ H04L 61/4511 |

OTHER PUBLICATIONS

International Preliminary Report on Patentability for PCT/IB2020/062495, ISA/IL, Dated: Jul. 5, 2022, 5 pages.
International Search Report and Written Opinion of International Searching Authority for PCT/IB2020/062495, ISA/IL, Jerusalem, Israel Dated: Mar. 4, 2021.
Non-Final Office Action of corresponding U.S. Appl. No. 16/729,823, Mail Date: Jul. 21, 2023; 27 pages.
Final Office Action of corresponding U.S. Appl. No. 16/729,823, Mail Date: Feb. 8, 2023; 17 pages.
Non-Final Office Action of corresponding U.S. Appl. No. 16/729,823, Mail Date: Sep. 16, 2022; 12 pages.

* cited by examiner

SYSTEM AND METHOD FOR DETERMINING DEVICE ATTRIBUTES USING A CLASSIFIER HIERARCHY

TECHNICAL FIELD

The present disclosure relates generally to device profiling, and more specifically to using machine learning to determine device attributes.

BACKGROUND

Whenever a new device connects to a network of an organization or is activated in a location that is proximate to the organization's physical location, there is a possibility that the new device could be used by a malicious entity to cause harm to the organization, the network, or both. The number of potential problems that may occur due to network access has increased exponentially due to the rapidly increasing number of new devices that are now capable of network connectivity. Further, many of these new devices are not only capable of connecting to networks but may also be able to create their own networks or hotspots.

Existing solutions for protecting against malicious devices include profiling devices as they engage in activities involving connecting to the network. Such device profiling can be utilized to determine whether a device is acting consistently with known behaviors typical for that kind of device and, therefore, whether the device may be demonstrating abnormal behavior indicative of a threat.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for determining device attributes using a classifier hierarchy. The method includes: sequentially applying a plurality of sub-models of a hierarchy to a plurality of features extracted from device activity data, wherein the sequential application ends with applying a last sub-model of the plurality of sub-models, wherein each sub-model includes a plurality of classifiers, wherein each sub-model outputs a class when applied to at least a portion of the plurality of features, wherein each class is a classifier output representing a device attribute, wherein applying the plurality of sub-models further comprises iteratively determining a next sub-model to apply based on the class output by a most recently applied sub-model and the hierarchy; and determining a device attribute based on the class output by the last sub-model.

Certain embodiments disclosed herein also include a non-transitory computer readable medium having stored thereon causing a processing circuitry to execute a process, the process comprising: sequentially applying a plurality of sub-models of a hierarchy to a plurality of features extracted from device activity data, wherein the sequential application ends with applying a last sub-model of the plurality of sub-models, wherein each sub-model includes a plurality of classifiers, wherein each sub-model outputs a class when applied to at least a portion of the plurality of features, wherein each class is a classifier output representing a device attribute, wherein applying the plurality of sub-models further comprises iteratively determining a next sub-model to apply based on the class output by a most recently applied sub-model and the hierarchy; and determining a device attribute based on the class output by the last sub-model.

Certain embodiments disclosed herein also include a system for determining device attributes using a classifier hierarchy. The system comprises: a processing circuitry; and a memory, the memory containing instructions that, when executed by the processing circuitry, configure the system to: sequentially apply a plurality of sub-models of a hierarchy to a plurality of features extracted from device activity data, wherein the sequential application ends with applying a last sub-model of the plurality of sub-models, wherein each sub-model includes a plurality of classifiers, wherein each sub-model outputs a class when applied to at least a portion of the plurality of features, wherein each class is a classifier output representing a device attribute, wherein applying the plurality of sub-models further comprises iteratively determine a next sub-model to apply based on the class output by a most recently applied sub-model and the hierarchy; and determining a device attribute based on the class output by the last sub-model.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
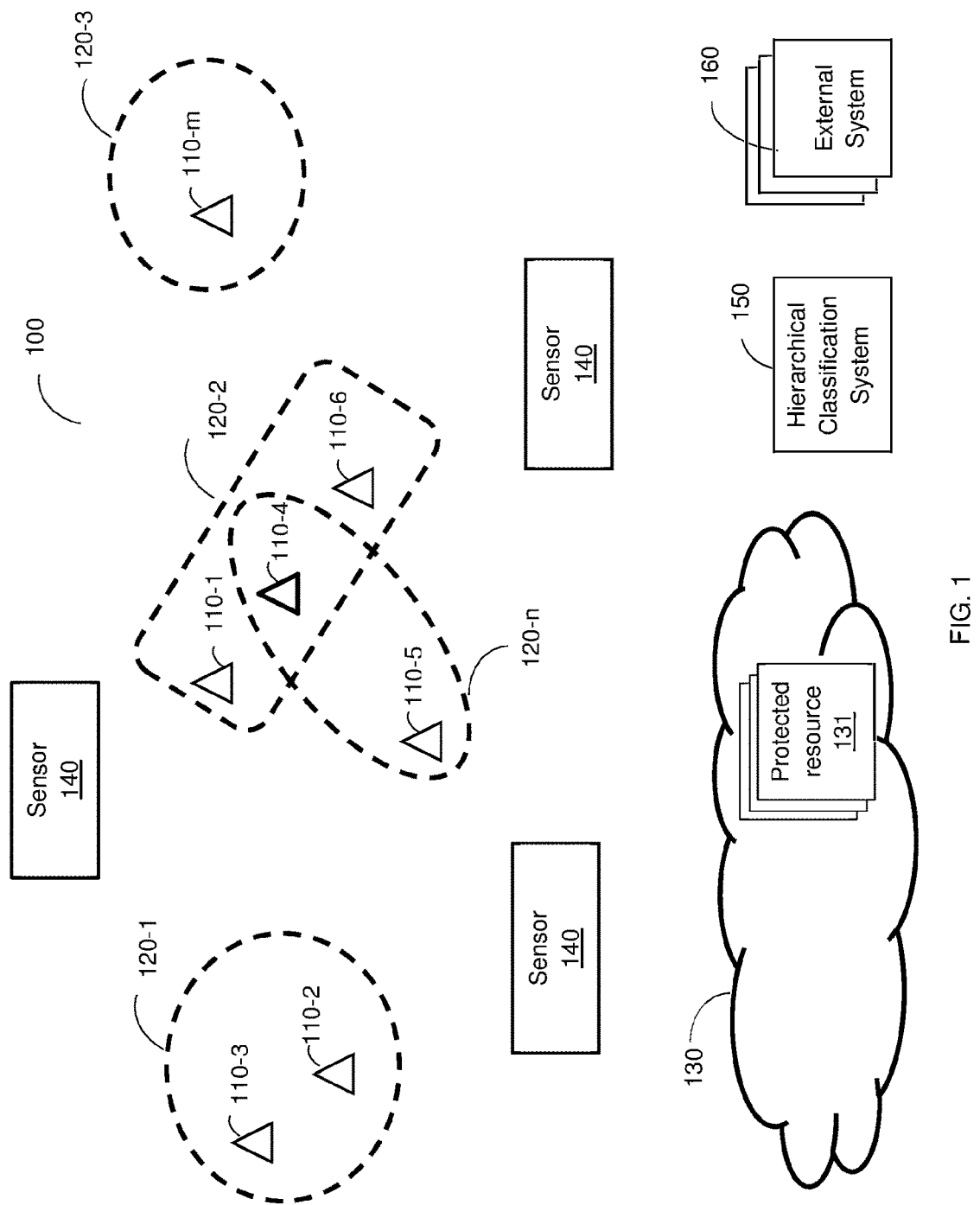
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Accurate device profiling relies on having complete and accurate device attributes. In this regard, it has been identified that device attributes are often absent or conflicting, particularly when a large amount of device attribute data is received from different sources. For example, network traffic data may be only partially covered due to deployment or due to sampling of data rather than continuous collection. As another example, device data may be conflicting when the data is continually collected over time or when different portions of data originate from different extraction libraries.

To this end, the disclosed embodiments provide solutions for improving accuracy of device attributes used for profiling. The disclosed embodiments include a system and method for determining device attributes using machine learning. More specifically, the disclosed embodiments provide a decision tree-based ensemble machine learning model aimed at providing device identification. The decision tree-based ensemble machine learning model is configured to determine device attributes using a hierarchical structure including sub-models of classifiers.

According to the disclosed embodiments, each level in a hierarchy includes multiple sub-models dedicated to the prediction of attributes. Each sub-model further includes one or more classifiers. More specifically, each classifier is trained to output a predicted class representing a device attribute and a confidence score for the prediction. An appropriate class is selected from among the predicted classes. The appropriate class selected from each sub-model is used to determine the next relevant sub-model to be applied.

In an embodiment, when one branch of the hierarchy has been fully traversed (i.e., a leaf node has been reached and its classifier has been applied), a device attribute may be determined. In another embodiment, a device attribute may be determined and the hierarchy may stop being traversed before a leaf node is reached (e.g., once a termination criterion has occurred). In a further embodiment, the termination criterion occurs when a confidence score below a threshold is output. That is, traversal may stop when one or more prior classifications had confidence scores above a threshold and a subsequent classification has a confidence score below the threshold. In such an embodiment, the most recent classification having a confidence score above the threshold may be used such that the last sub-model is the sub-model that output that most recent classification.

The disclosed embodiments provide techniques for improving machine learning processes that may improve accuracy of classification, reduce extraction of unnecessary features, or both. The disclosed embodiments also provide techniques for preprocessing training data to further improve the resulting hierarchy and, therefore, accuracy of the resulting classification. The disclosed embodiments may be utilized, for example, to fill in device attribute fields of a device profile, which in turn may be utilized to detect abnormal activity as compared to devices having similar profiles. Thus, the disclosed embodiments allow for improved mitigation of cybersecurity threats posed by unknown devices.

FIG. 1 is an example network diagram of a wireless environment 100 utilized to describe various disclosed embodiments. The wireless environment 100 includes a plurality of wireless devices 110-1 through 110-m (hereinafter referred to individually as a wireless device 110 and collectively as wireless devices 110, merely for simplicity purposes) and a plurality of coexisting wireless networks 120-1 through 120-n (hereinafter referred to individually as a wireless network 120 and collectively as wireless networks 120, merely for simplicity purposes), thereby allowing communication between and among the wireless devices 110. Also, operable in the wireless environment 100 is an internal network 130 of an organization. The internal network 130 includes protected resources 131. Such protected resources 131 may include, but are not limited to, servers, computers, databases, services, applications, data, and the like.

Each wireless device 110 may be, but is not limited to, a laptop, a PC, a smartphone, an IoT device, a wearable device, a peripheral device (e.g., a printer, a mouse, a keyboard, a speaker, etc.), an appliance, a remote controller, a wireless router (access point), or any other electrical or electronic device that can communicate over a wireless network.

The wireless network 120 can facilitate communication using wireless communication protocols such as, but not limited to, Wi-Fi, nRF, cellular communication protocols (e.g., LTE, 2G, 3G, 4G, etc.), Bluetooth®, Wi-Gi, Zigbee, Z-Wave, 5 Bluetooth low energy (BLE), EnOcean, DECT, 6LOWPAN, and the like. It should be noted that application layer protocols can communicate over such wireless protocols. Examples for application layer protocols include, but are not limited to, AirDrop®, HTTP, SMB, NTLM, OBEX, and the like.

In an example implementation, a plurality of sensors 140-1 through 140-p (hereinafter referred to individually as a sensor 140 and collectively as sensors 140, merely for simplicity purposes) are deployed in the wireless network 100. Each sensor 140 is deployed as an out-of-band device and configured to monitor and control the wireless traffic transmitted by the wireless devices 110 in proximity of where the sensor 140 is deployed. In some embodiments, a sensor 140 can be deployed as a device connected in the wireless network 100, as a passive device that merely listens to the traffic, or as a tap device.

Each sensor 140 is configured to process the monitored traffic based on a corresponding wireless communication protocol. For example, if the monitored traffic is transmitted over a Bluetooth® connection, the sensor 140 is configured to extract data as carried by the Bluetooth® protocol through its entire stack. Such data may include headers and payload data required to determine, for example, if a new connection is established, if an existing connection is identified, a type of data being transmitted, or a combination thereof. Thus, each sensor 140 is configured to process stack (all or some of the layers) of each wireless protocol supported by the sensor 140. Examples for such wireless protocols are mentioned above. In an embodiment, each sensor 140 can handle at least one type of wireless protocol.

As an example, a sensor 140 can sniff traffic transmitted between two wireless devices 110 over a secured Wi-Fi network (e.g., the network 120-1). To extract the protocol-data, the sensor 140 is required to decrypt the data being transmitted over the air. To this end, according to an embodiment, the passphrase of the Wi-Fi network is uploaded to and stored in the sensor 140. Using the passphrase, the sensor 140 can act as a passive device configured to listen to data traffic over the Wi-Fi network and decrypt any data traffic transported between the devices (e.g., the wireless devices 110-3 and 110-2 in the network 120-1).

Specifically, when a new wireless device 110 connects to the Wi-Fi network, a key exchange protocol is performed between the access point and the new device. A sensor 140 may be configured to capture this communication. In an example implementation, the key exchange protocol is a 4-way handshake process that is a double-sided challenge-response designed to verify that both parties can derive the same encryption key without ever sending the key directly. The process can be performed for mutual authentication. Upon capturing the authentication packets, the sensor 140 is configured to derive, using the preconfigured passphrase, the same key just like the new wireless device 110. The keys are utilized to decrypt and encrypt any traffic transported between the new wireless device 110 and an access point.

A sensor 140 is also configured to capture BLE communications between two paired wireless devices 110 and to extract protocol-data. To discover the encryption key, the passkey entry (e.g., 6 digits when a passkey entry pairing procedure is utilized) is guessed or preconfigured either by the sensor 140 or the system 150. For example, the passkey entry can be guessed by trying all possible options of a 6-digit code. Using the discovered passkey entry and captured handshake, the encryption key can be derived for the session based on the BLE key exchange procedure. Using that encryption key, the communication between two BLE devices 110 can be decrypted and the protocol-data is extracted.

In another example implementation, the sensor 140 can extract traffic parameters by querying network devices (not shown) installed or deployed in the environment 100. For example, the sensor 140 can query a wireless access point about new connections being established and the wireless devices that participated in such establishments of connections. For example, a network device can be queried on the type of connection being established, the protocol type, the wireless devices participated in the connection, when the connection was established, and so on. In yet another embodiment, the sensor 140 can query the wireless devices 110 to retrieve information about a particular wireless device 110. For example, the vendor and current OS type of the wireless device 110-2 can be retrieved by querying the wireless device 110-2.

The data extracted by each sensor 140 may be sent to the hierarchical classification system 150 for further analysis. As a non-limiting example, when the sensor 140 identifies a new wireless connection, data associated with the new wireless connection is sent to the hierarchical classification system 150.

The information utilized to determine device attributes is processed by the sensor 140, the hierarchical classification system 150, or both. In an embodiment, for example, the sensors 140 can identify MAC addresses in traffic transported over the air. The MAC addresses are sent to the hierarchical classification system 150, which correlates the addresses to identify a single device that is associated with two or more MAC addresses. A MAC address can also provide an indication of a vendor for a given device. Determination of a device's vendor based on the MAC address may be performed by the sensors 140 or by the hierarchical classification system 150.

It should be noted that the information provided by the sensors 140 to the hierarchical classification 150 may be decrypted and may contain relevant information for analysis by the hierarchical classification system 150. For example, such information may include network addresses (e.g., IP addresses, URLs, port numbers, etc.) accessed by a wireless device 110. The information may include data being accessed or transferred by a wireless device 110. For example, the contents of a Word document transferred from a wireless device 110 to a location in or outside the wireless environment would be provided to the hierarchical classification system 150.

In an embodiment, the sensors 140 are also configured to perform mitigation actions under the control of the hierarchical classification system 150. For example, the sensor 140 can terminate a wireless connection with a wireless device 110 determined to be vulnerable. In another embodiment, the hierarchical classification system 150 may be configured to perform the mitigation actions or to cause the sensors 140 to perform the mitigation actions.

Each sensor 140 may be realized as a physical appliance, a virtual appliance (executed by a processing system), or a combination thereof. Examples for virtual appliance implementations include, but are not limited to, a virtual machine, a micro-service, a software agent, and the like.

The hierarchical classification system 150 may be deployed in a datacenter, a cloud computing platform (e.g., a public cloud, a private cloud, or a hybrid cloud), on-premises of an organization, or in a combination thereof. The hierarchical classification system 150 or functions thereof may be embedded in one or more of the sensors 140.

In an example deployment, the hierarchical classification system 150 is configured to interface with one or more external systems 160. Examples for such external systems 160 may include, but are not limited to, an active directory of the organization utilized to retrieve user permissions, access control systems, security information and event management (SIEM) systems utilized to report on detected vulnerabilities, or other devices that can feed the hierarchical classification system 150 with potential threats or known vulnerabilities. The external systems 160 may further include an inventory management system, an identity management system, an authentication server, and the like.

In an embodiment, the hierarchical classification system 150 is configured to determine device attributes as described herein. Specifically, the hierarchical classification system 150 is configured to navigate a classifier hierarchy in order to determine each device attribute, for example, a device attribute of one of the wireless devices 110. The hierarchical classification system 150 may be further configured to train sub-models of the hierarchy as described herein.

The hierarchical classification system 150 may be further configured to detect wireless devices 110 that do not belong to the organization which may perform malicious activity, and thus may pose a risk to devices and networks in the wireless environment 100. Without limiting the scope of the disclosed embodiments, such devices will be referred to as vulnerable devices. Such detection may be performed in part based on data extracted by and received from the sensors 140. The hierarchical classification system 150 may be configured to profile each wireless device 110 discovered in the wireless environment 100 using device attributes determined as described herein. The profiling of devices is performed in part to determine if a device is a legitimate device. In some implementations, the hierarchical classification system 150 is configured to create a list of legitimate devices and a list of "unknown devices." A legitimate device is a wireless device 110 that is authorized to access the internal network 130 or any protected resource 131. An unknown device is a wireless device 110 that cannot be identified as a legitimate device.

In some implementations, a risk score may be determined for each device 110 (both unknown and legitimate) detected in the environment 110 based on the determined device attributes. The risk score is determined based on activities performed by the device and the profile of the device. The activities may relate to the type of the detected vulnerability, the internal resources being accessed, the type of data being exploited, the type of data being transmitted by the device, a device type, a connection type, or any combination thereof.

In order to discover new wireless devices 110, the sensors 140 may be configured to detect any new wireless connections being established in the wireless environment 100. For example, any new connection established with an access point (e.g., over a Wi-Fi network) or with another device (e.g., a Bluetooth® connection) is detected. Alternatively or collectively, wireless devices 110 can be detected when devices are disconnected from the network. For example, if the wireless device 110 detects a probe request from a Wi-Fi network or a page request in a Bluetooth network, such requests are indicative of a disconnected device. The wireless device 110 that initiated such requests is a discovered device.

At least a unique identifier of a device that initiated the connection is extracted or determined by the sensor 140. Based on the value of the extracted unique identifier, it is determined if the device was already discovered. The unique identifier may include, but is not limited, to a MAC address. A list of previously discovered devices can be managed in a centralized location (e.g., in the hierarchical classification system 150) or distributed among the various sensors 140.

It should be noted that the unique identifier is not always available upon discovering a new wireless device 110. For example, Bluetooth piconets, slave devices, and the like are identified without having knowledge of their MAC addresses. In such cases, the unique identifier may be a temporary slot address assigned by a master device to the slave device using the temporary slot address. The MAC address of the slave device can be extracted at a later time.

In an embodiment, the hierarchical classification system 150 may be configured to determine whether a wireless device 120 is vulnerable based on the profile for the device and data indicating activity of the wireless device 120. Specifically, a wireless device 120 may be determined to be vulnerable if, for example, the activity of the wireless device 120 is abnormal given the device attributes in the profile of the wireless device 120. Such abnormalities may be defined by predetermined rules for different device attributes, using a machine learning model trained using activity data from devices having different device attributes, or a combination thereof.

It should be appreciated that the embodiments disclosed herein are not limited to the specific architecture illustrated in FIG. 1 and that other architectures may be used without departing from the scope of the disclosed embodiments. Specifically, in an embodiment, there may be a plurality of hierarchical classification systems 150 operating as described hereinabove and configured to either have one as a standby, to share loads between them, or to split the functions between them.

Further, in a typical wireless environment 100 or a typical deployment, there will be a plurality of internal networks 130 which can co-exist, i.e., a single network 130 is shown in FIG. 1 merely for the purpose of simplicity of discussion. Communications according to the disclosed embodiments may be conducted via networks such as, but not limited to, a wireless, cellular or wired network, a local area network (LAN), a wide area network (WAN), a metro area network (MAN), the Internet, the worldwide web (WWW), similar networks, and any combination thereof.

It should be further noted that, in some configurations, one or more sensors 140 can be embedded in the hierarchical classification system 150. Additionally, the wireless devices 120 are described as being wireless, but device attributes may also be determined for wired devices in accordance with the disclosed embodiments.

Figure 2:
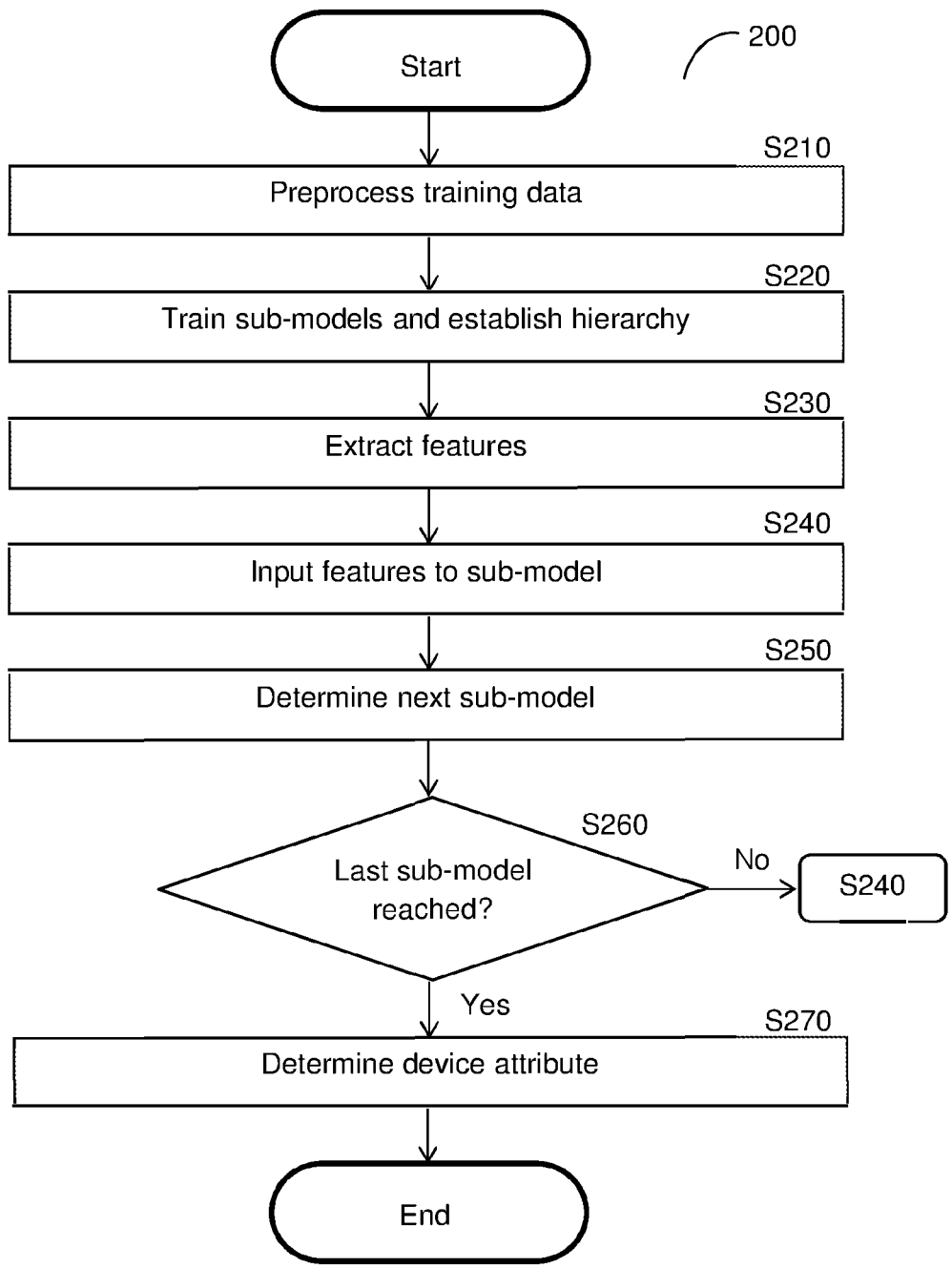
FIG. 2 is a flowchart illustrating a method for determining a device attribute using a classifier hierarchy according to an embodiment.

FIG. 2 is an example flowchart 200 illustrating a method for determining a device attribute using a classifier hierarchy according to an embodiment. In an embodiment, the method is performed by the hierarchical classification system 150, FIG. 1.

At S210, training data to be used for training classifiers of a hierarchy is preprocessed. The training data includes data related to multiple devices such as, but not limited to, data obtained from a device, data related to activity of a device (e.g., network activity), or a combination thereof. The network activity data may include, but is not limited to, amounts of traffic sent and received, domains used, ports used, number of sessions, number of hosts that are talked to, and the like, over a period of time. In an embodiment, the training data further includes class labels indicating device attributes of each device.

In an embodiment, S210 includes extracting features from the training data. The features to be extracted are based on the classifiers to be applied.

In a further embodiment, S210 may further include cleaning the training data. The classifiers to be used may include a predetermined set of classifiers, with each classifier being associated with a different device attribute. The classifiers include some classifiers that do not overlap in device attributes (e.g., a classifier associated with mobile devices and a classifier associated with non-mobile devices) and some classifiers that overlap in device attributes such that one classifier is associated with a more specific device attribute than the other (e.g., a classifier associated with mobile devices and a classifier associated with smartphones, i.e., a specific type of mobile device).

In an embodiment, S210 further includes reducing the training data with respect to devices. To this end, data related to at least some of the devices may be excluded. In yet a further embodiment, data related to devices for which the required device attributes are unknown (i.e., unlabeled), data related to devices for which identified device attributes are not consistent (i.e., inconsistent labels), or both, may be excluded.

In another embodiment, S210 may further include removing one or more of the training device attribute classes indicated by the training labels. To this end, S210 may include excluding classes, modifying classes, or both. To this end, classifiers associated with the excluded or modifying classes may be excluded or modified. Excluded classes may include, but are not limited to, classes which have a small (e.g., below a threshold) number of examples in the training data, i.e., classes for which a small number of devices have the class as a device attribute. Modifying classes may include merging multiple classes, for example, classes which have a low degree of behavioral trait variance (e.g., classes for which similarity of features used to determine the class is above a threshold), into a single class.

At S220, the sub-models of the hierarchy are trained and the hierarchy is established. In an embodiment, the sub-models are trained using gradient boosted trees.

In an embodiment, the hierarchy includes multiple levels with at least some levels including multiple sub-models. Sub-models of different levels provide different granularities with respect to device attributes. As a non-limiting example, a lower granularity sub-model may be trained to determine a device type (e.g., "printer"), and a higher granularity sub-model may more specifically be trained to determine a model of the device (e.g., "ABC Company Model 8 Printer").

In an embodiment, the hierarchy uses ensemble learning techniques. Specifically, different classifiers of sub-models of the hierarchy may be applied to features extracted from a data set, and a class representing a device attribute is selected based on the outputs of the classifiers of each sub-model. To this end, each classifier may be trained to output a confidence score for its respective class. The confidence score indicates a likelihood that the class of the classifier represents the correct device attribute and may be compared to other confidence scores to determine which label should be selected.

Figure 3:
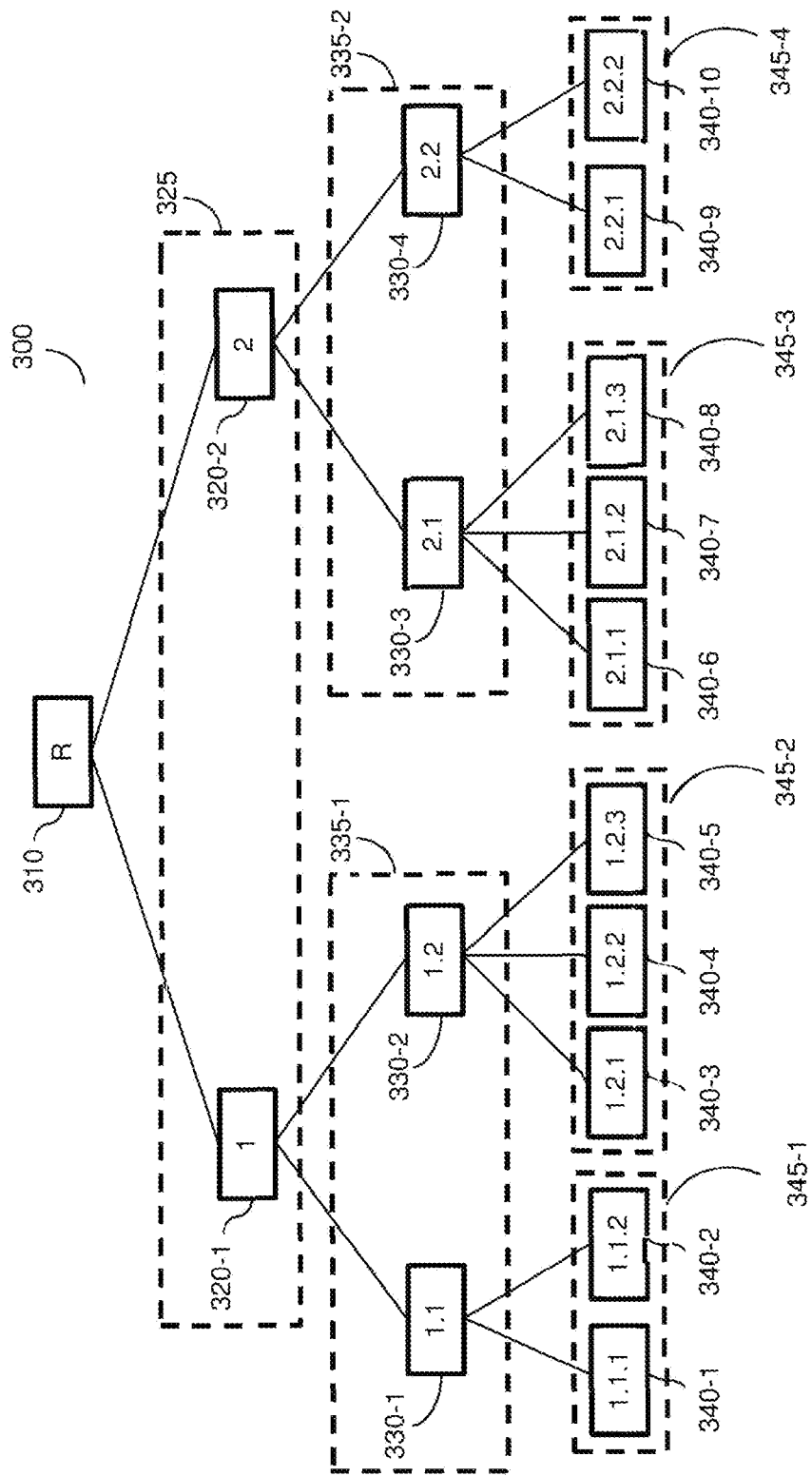
FIG. 3 is a diagram illustratively representing a classifier hierarchy according to an embodiment.

An example hierarchy of classifiers is visually represented in FIG. 3. FIG. 3 is a diagram illustratively representing a classifier hierarchy 300 according to an embodiment. In FIG. 3, the hierarchy is a model including nodes 310 through 340. Each node represents a respective classifier associated with a respective attribute. Nodes lower in the hierarchy 300 therefore represent higher granularity classifiers than nodes higher in the hierarchy. The nodes 320, 330, and 340 (i.e., nodes other than the root node) are grouped into sub-models 325, 335, and 345, respectively.

In the hierarchy 300, the node 310 is a root (R) node representing an initial class (or lack thereof). When at the root node 310, a first sub-model 325 of classifiers 320-1 and 320-2 is applied, for example using ensemble learning techniques. Specifically, all classifiers 320 in the sub-model 325 are applied, and an appropriate class is determined based on the results of the classifiers 320.

Subsequent sub-models are applied based on results of applying previous sub-models. More specifically, based on the class determined using one sub-model, the next sub-model to be used is determined. The next sub-model is a relevant sub-model (i.e., relevant to the last determined class) and that is in the next level of the hierarchy (for example, the sub-models 335 are in the next level of the hierarchy as compared to the sub-model 325).

When determining device attributes, the hierarchy 300 is navigated by applying sub-models sequentially starting with the sub-model including nodes directly below the root node 310 until a leaf node of a path being navigated is reached (in the example hierarchy 300, the leaf nodes of all paths are the nodes 340) or until another termination criterion has occurred (e.g., outputting a confidence score below a threshold for a classification by one of the sub-models, reaching a predetermined level in the hierarchy, or determining a confidence score for a device attribute that is above a threshold). By applying the classifiers in stages, device attributes may be more accurately determined. Specifically, each classifier is trained with respect to a subset of a broader set of possible device attributes such that the culmination of stages may be more accurate than, for example, applying a single classifier to determine the device attribute. Further, different features may be extracted for each sub-model, thereby allowing for further improving accuracy of classification by allowing for tailoring inputs to classifiers.

As a non-limiting example, when the classifiers 320-1 and 320-2 of sub-model 325 are trained to classify features into mobile device or non-mobile, the classifier associated with node 320-1 may represent the class "mobile device" and the classifier associated with node 320-2 may represent the class "non-mobile device." A result of applying the sub-model 325 will be selection of either "mobile device" or "non-mobile device" as the appropriate device attribute for the device.

It should be noted that the hierarchy described with respect to FIG. 3 is a non-limiting visual representation, and that the hierarchy in accordance with the disclosed embodiments does not need to be arranged as shown in FIG. 3. In particular, different numbers of nodes in total, nodes at each level, nodes in each sub-model, of sub-models, and the like, may be utilized without departing from the scope of the disclosure. Likewise, the downwardly branching direction of the hierarchy is merely used to visually depict relationships between nodes and to distinguish among different levels of nodes and should not be interpreted as limiting. For example, the hierarchy may be equally visualized as an upwardly flowing hierarchy without departing from the scope of the disclosure. Additionally, not all leaf nodes will be at the same level, i.e., some device attributes may require more applications of sub-models than others to arrive at a most specific device attribute.

Returning to FIG. 2, in an embodiment, the training of each classifier is a supervised machine learning process using training data including training device data and labels indicating device attribute classifications. The training device data may include, but is not limited to, data obtained by inspecting device, data obtained by monitoring traffic into and out of the device, network data related to the device, and the like. Such training device data may include types of data that are captured by systems monitoring the device (e.g., the sensors 140 monitoring the wireless devices 110, FIG. 1).

At S230, features are extracted from the application data. The extracted features include features required by each classifier to be used as part of the hierarchical ensemble classification. In some embodiments, features may be extracted as needed while navigating the hierarchy. For example, because navigating the hierarchy includes selecting sub-models (i.e., groups of one or more classifiers) in the next level of the hierarchy to be used, features may be extracted only when needed by classifiers of the next selected sub-model. This allows for minimizing the amount of feature extraction. Alternatively, all potentially necessary features may be extracted prior to navigating the hierarchy.

At S240, a sub-model is applied to the features extracted from the application data in order to determine an appropriate class. In an embodiment, first sub-model applied is the sub-model including nodes directly below a root node (e.g., the root node 310, FIG. 3).

In an embodiment, S240 each classifier of the sub-model is applied to the relevant features and an appropriate class is determined based on the output of each classifier. In an example implementation, each classifier outputs a confidence score, and the class of the classifier which outputs a confidence score above a threshold is determined as the appropriate class. Alternatively, the class of the classifier which outputs the highest confidence score may be determined as the appropriate class. In some implementations, if all classifiers output a confidence score below a threshold, no device attribute or a null value may be determined.

At S250, based on the output of the classifiers applied at S240, the next relevant sub-model of the hierarchy is determined. In an embodiment, the next relevant sub-model is the sub-model in the next level of the hierarchy that is associated with the class determined using the previous sub-model.

At S260, it is determined if a last sub-model for the current traversal of the hierarchy has been reached. If so, execution continues with S270; otherwise, execution continues with S240 where features are input to a relevant sub-model in the next level of the hierarchy. In an embodiment, the last level of the hierarchy in which the last sub-model is located may be different depending on the path taken while traversing the hierarchy.

In an embodiment, the last sub-model of the hierarchy for a particular path has been reached when a termination criterion has occurred. In an embodiment, the termination criterion has occurred when no more sub-models being along the path (e.g., when each classifier of the sub-model is represented by a leaf node). Note that the last sub-model according to the disclosed embodiments does not need to be a sub-model in the lowest or highest level of the hierarchy, and that traversal may cease before such a level is reached.

In an embodiment, the termination criterion may be that a sub-model outputs a low confidence classification having a confidence score below a threshold. In such an embodiment, the most recently applied sub-model prior to the sub-model that output the low confidence classification is identified as the last sub-model such that the classification of such most recently applied sub-model is used for determining the device attribute. Thus, any more specific classification that fails to meet the confidence score threshold may be excluded from use, thereby further improving accuracy of the device attribute determination.

At S270, a device attribute is determined. In an embodiment, the device attribute is determined based on the appropriate class determined for the most recently applied sub-model. The device attribute may be used, for example, as part of a device profile, which in turn may be used to identify abnormal activity of devices which may require mitigation. Thus, the device attribute identification described herein may be utilized to accurately profile the device, which in turn allows for more accurately identifying abnormalities in device behavior by comparison to devices having the same device attributes or combinations of device attributes. An example for such a use is demonstrated in FIG. 4.

As a non-limiting example, in FIG. 3, when the output of the classifier 320-1 is a confidence score of 9 for the class "mobile device" and the output of the classifier 320-2 is a confidence score of 5 for the class "non-mobile device" when applying the sub-model 325, the class "mobile device" is selected as appropriate such that the next relevant sub-model is determined to be the sub-model 335-1 (i.e., the sub-model in the next level that is below the sub-model 325). The same process is performed by applying the classifiers 330-1 and 330-2 of the sub-model 335-1 and, based on the output of those classifiers, sub-model 345-2 (e.g., representing the class "smartphones") is determined as the next relevant sub-model. By applying the classifiers 340-3 through 340-5 of the sub-model 345-2, it is determined that the class of the classifier 340-4 (e.g., representing the class "ABC Brand smartphone") is the appropriate class. Since the sub-model 345-2 is in the last level for that path within the hierarchy, the class of the classifier 340-4 is determined as the device attribute.

Figure 4:
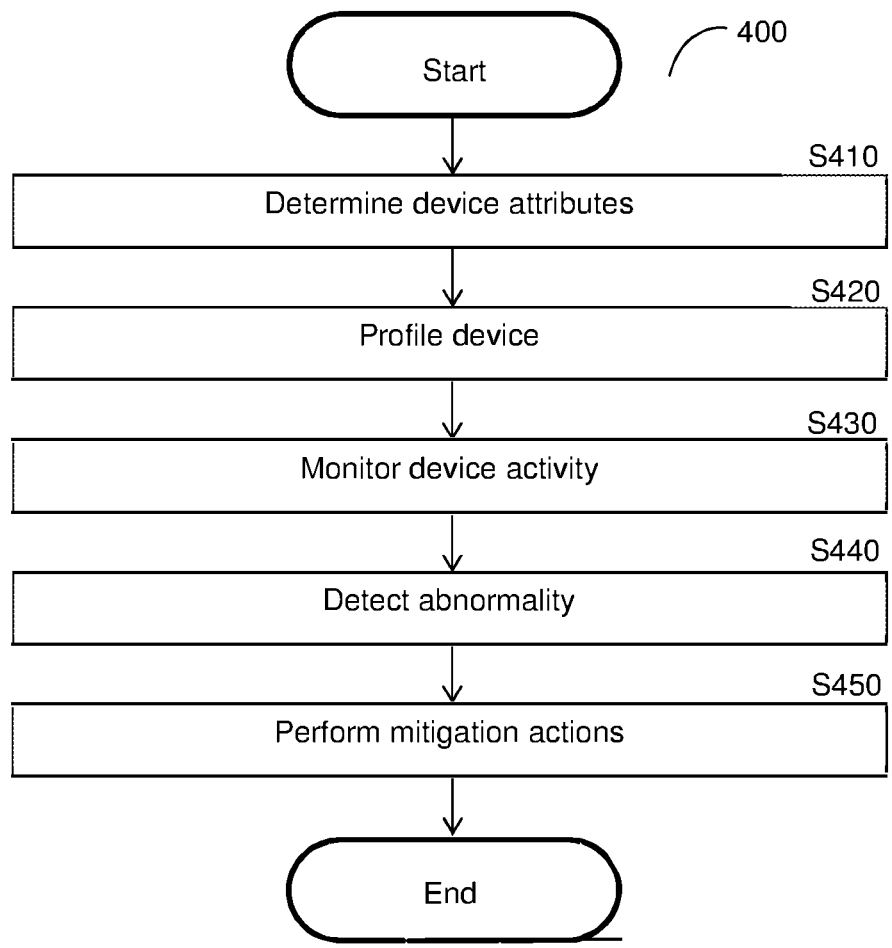
FIG. 4 is a flowchart illustrating a method for performing mitigation actions based on device attributes according to an embodiment.

FIG. 4 is an example flowchart 400 illustrating a method for mitigating abnormal device activity based on device attributes according to an embodiment.

At S410, device attributes for a device (e.g., one of the wireless devices 110, FIG. 1) are determined. In an embodiment, at least some of the device attributes are determined using a classifier hierarchy as described further above with respect to FIG. 2.

At S420, a device profile is created for the device based on the determined device attributes.

At S430, device activity is monitored. The device activity may include, but is not limited to, network activity of the device.

At S440, an abnormality is detected based on the monitored device activity and the device profile. The abnormality may be detected, for example, based on predetermined rules (e.g., rules defining values or combinations of values of device activity data that are abnormal) or using a machine learning model trained based on historical device profile data. In an embodiment, different rules or models may be applied for different device attributes. As a non-limiting example, rules applied for a mobile device may be different for rules applied to a server.

At S450, one or more mitigation actions are performed to mitigate the detected abnormality. The mitigation actions may include, but are not limited to, severing one or more connections of the device (e.g., connections to a network), sending a notification indicating the abnormally behaving device, or a combination thereof.

Figure 5:
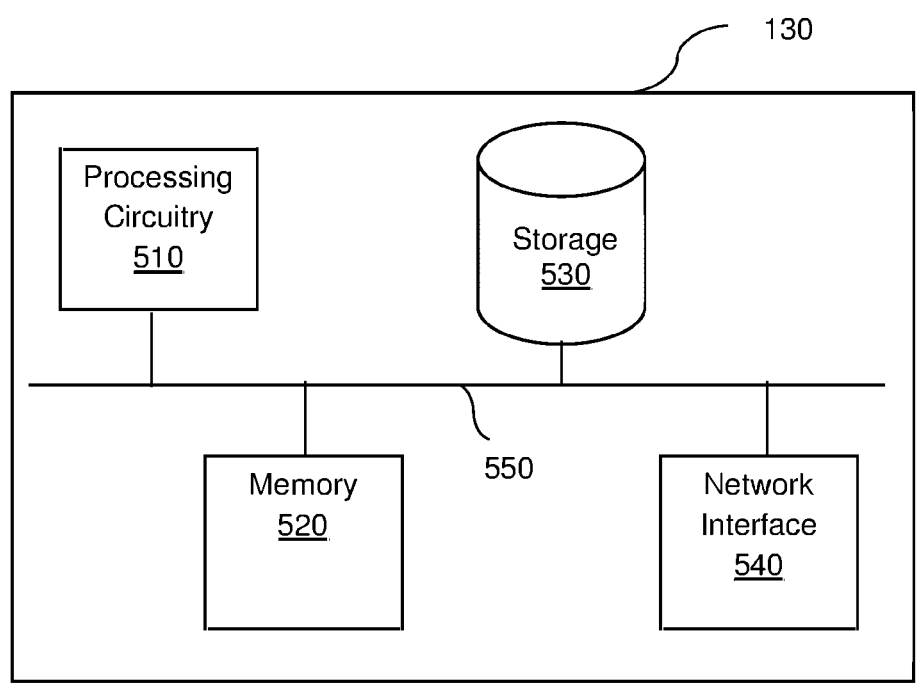
FIG. 5 is a schematic diagram of a device attribute hierarchical classification system according to an embodiment.

FIG. 5 is an example schematic diagram of a device attribute hierarchical classification system 150 according to an embodiment. The device attribute hierarchical classification system 150 includes a processing circuitry 510 coupled to a memory 520, a storage 530, and a network interface 540. In an embodiment, the components of the device attribute hierarchical classification system 150 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., RAM, etc.), non-volatile (e.g., ROM, flash memory, etc.), or a combination thereof.

In one configuration, software for implementing one or more embodiments disclosed herein may be stored in the storage 530. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, CD-ROM, Digital Versatile Disks (DVDs), or any other medium which can be used to store the desired information.

The network interface 540 allows the device attribute hierarchical classification system 150 to communicate with, for example, the wireless devices 110 or the sensors 140 for the purpose of, for example, receiving data related to device attributes, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices.

The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

We claim:

1. A method for determining device attributes using a classifier hierarchy, comprising:
    extracting a plurality of features from device activity data;
    applying a first sub-model of a plurality of sub-models of a hierarchy, wherein each sub-model of the plurality of sub-models comprises a set of classifiers, and wherein each sub-model of the plurality of sub-models is configured to output a class for a device attribute when applied to the plurality of features based on its respective set of classifiers;
    iteratively traversing the hierarchy until a termination condition occurs, wherein each iteration of traversing the hierarchy comprises:
        determining a next sub-model at a next level in the hierarchy, wherein the next sub-model is specifically associated with the class output by a previous sub-model; and
        applying the next sub-model to the plurality of features;
    upon the termination condition occurring, determining a device attribute based on the class output by a last-applied sub-model.

2. The method of claim 1, wherein the device activity data comprises network activity data.

3. The method of claim 2, wherein the network activity data comprises at least one of: amount of traffic sent, amount of traffic received, domains used, ports used, a number of sessions, and a number of hosts that are talked to.

4. The method of claim 1, wherein each classifier of a sub-model is trained to output a class and a confidence score, and wherein the class output by each sub-model of the plurality of sub-models is based on the class and the confidence score output by each classifier of the set of classifiers of the respective sub-model.

5. The method of claim 4, wherein the class output by each sub-model is a first class output of a first classifier of the respective sub-model, wherein a first confidence score output by the first classifier is above a threshold.

6. The method of claim 4, wherein the termination condition occurs when a confidence score below a threshold is output.

7. The method of claim 4, wherein the termination condition occurs when a confidence score above a threshold is output.

8. The method of claim 1, wherein the termination condition occurs when one branch of the hierarchy has been fully traversed.

9. The method of claim 1, wherein the termination condition occurs when a predetermined level in the hierarchy is reached.

10. A system for determining device attributes using a classifier hierarchy, comprising:
    a processing circuitry; and
    a memory, the memory containing instructions that, when executed by the processing circuitry, configure the system to:
        extract a plurality of features from device activity data;
        apply a first sub-model of a plurality of sub-models of a hierarchy, wherein each sub-model of the plurality of sub-models comprises a set of classifiers, and wherein each sub-model of the plurality of sub-models is configured to output a class for a device attribute when applied to the plurality of features based on its respective set of classifiers;
        iteratively traverse the hierarchy until a termination condition occurs, wherein each iteration of traversing the hierarchy comprises:
            determining a next sub-model at a next level in the hierarchy, wherein the next sub-model is specifically associated with the class output by a previous sub-model; and
            applying the next sub-model to the plurality of features;
        upon the termination condition occurring, determine a device attribute based on the class output by a last-applied sub-model.

11. The system of claim 10, wherein the device activity data comprises network activity data.

12. The system of claim 11, wherein the network activity data comprises at least one of: amount of traffic sent, amount of traffic received, domains used, ports used, a number of sessions, and a number of hosts that are talked to.

13. The system of claim 10, wherein each classifier of a sub-model is trained to output a class and a confidence score, and wherein the class output by each sub-model of the plurality of sub-models is based on the class and the confidence score output by each classifier of the set of classifiers of the respective sub-model.

14. The system of claim 13, wherein the class output by each sub-model is a first class output of a first classifier of the respective sub-model, wherein a first confidence score output by the first classifier is above a threshold.

15. The system of claim 13, wherein the termination condition occurs when a confidence score below a threshold is output.

16. The system of claim 13, wherein the termination condition occurs when a confidence score above a threshold is output.

17. The system of claim 10, wherein the termination condition occurs when one branch of the hierarchy has been fully traversed.

18. The system of claim 10, wherein the termination condition occurs when a predetermined level in the hierarchy is reached.

19. A non-transitory computer readable medium having stored thereon instructions for causing a processing circuitry to execute a process, the process comprising:
   extracting a plurality of features from device activity data;
   applying a first sub-model of a plurality of sub-models of a hierarchy, wherein each sub-model of the plurality of sub-models comprises a set of classifiers, and wherein each sub-model of the plurality of sub-models is configured to output a class for a device attribute when applied to the plurality of features based on its respective set of classifiers;
   iteratively traversing the hierarchy until a termination condition occurs, wherein each iteration of traversing the hierarchy comprises:
      determining a next sub-model at a next level in the hierarchy, wherein the next sub-model is specifically associated with the class output by a previous sub-model; and
      applying the next sub-model to the plurality of features;
   upon the termination condition occurring, determining a device attribute based on the class output by a last-applied sub-model.

20. The non-transitory computer readable medium of claim 19, wherein the termination condition occurs when one branch of the hierarchy has been fully traversed.

* * * * *